US007258555B2

(12) United States Patent
Tiesler et al.

(10) Patent No.: US 7,258,555 B2
(45) Date of Patent: Aug. 21, 2007

(54) SYSTEM AND METHOD FOR ELECTRICAL POWER TRACK AND SLIDABLE ACCESSORIES

(75) Inventors: John M. Tiesler, Harrison Township, MI (US); James R. Mestemaker, Lambertville, MI (US)

(73) Assignee: International Automotive Components Group North America, Inc., Dearborn, MI (US)

(*) Notice: Subject to any disclaimer, the term of this patent is extended or adjusted under 35 U.S.C. 154(b) by 245 days.

(21) Appl. No.: 10/906,986

(22) Filed: Mar. 15, 2005

(65) Prior Publication Data

US 2006/0209531 A1 Sep. 21, 2006

(51) Int. Cl.
*H01R 25/00* (2006.01)

(52) U.S. Cl. ...................................... 439/121; 439/110

(58) Field of Classification Search ................ 439/121, 439/34, 94, 110, 115, 532, 716, 929
See application file for complete search history.

(56) References Cited

U.S. PATENT DOCUMENTS 3,813,633 A * 5/1974 Clement ...................... 439/94
3,894,781 A * 7/1975 Donato ....................... 439/121
4,655,520 A * 4/1987 Cummings .................. 439/111
5,077,643 A 12/1991 Leach
5,522,704 A * 6/1996 Casteel ....................... 416/246
5,599,086 A 2/1997 Dutta
6,059,582 A * 5/2000 Tsai ........................... 439/121
6,231,111 B1 5/2001 Carter et al.
6,398,394 B1 6/2002 Winnik
2002/0022406 A1 2/2002 Hutchison

FOREIGN PATENT DOCUMENTS

DE 3416143 A1 11/1985
DE 103 09 350 A1 9/2004
FR 2837323 A1 3/2002
WO WO94/16479 A1 7/1994

* cited by examiner

*Primary Examiner*—Tho D. Ta
(74) *Attorney, Agent, or Firm*—Brooks Kushman P.C.

(57) ABSTRACT

A system for vehicle interior electrical power distribution includes an electrical power track assembly having at least one electrical power strip and at least one electrical ground strip, and an electrical connector assembly slidable in the track assembly. The electrical connector assembly has a first set of electrical contacts and a second set of electrical contacts. The first set of electrical contacts are configured to maintain electrical connection with respective ones of the at least one electrical power strip and the at least one electrical ground strip during sliding such that the slidable connector assembly provides electrical power to respective ones of the second set of electrical contacts, and the second set of electrical contacts are configured to electrically couple to and provide electrical power to at least one removable electrical accessory that is installed to the slidable connector assembly.

20 Claims, 2 Drawing Sheets

100
106
230
232
234
170
104
162
190
214
160
212
210
150, 152
192
102
164
120
162
200
122
202
204
232

300
302
100
230

SYSTEM AND METHOD FOR ELECTRICAL POWER TRACK AND SLIDABLE ACCESSORIES

BACKGROUND OF THE INVENTION

1. Field of the Invention

The present invention relates to a system and method for an electrical power track and slidable accessories.

2. Background Art

Operators (i.e., users, passengers, drivers, operators, etc.) of vehicles, particularly, but not exclusively large vehicles such as sport utility vehicles, cross-over vehicles, vans, minivans, busses, etc. with a cargo area (generally in the center or rear area of the vehicles and having a length generally greater than a meter or more) often desire electrical power outlets, lighting and other electrical accessories at locations throughout the cargo area.

Conventional approaches to providing the desired power outlets, lighting and other electrical accessories have the deficiencies of being expensive when multiple electrical power outlets, lighting and other electrical accessories are implemented, and unwieldy when lengthy electrical cables are used.

Conventional approaches to implementing track mounted slidable electrically powered accessories have had the deficiencies of being unsuitable for multiple accessory use, lacking in physical robustness, and having excessively sticky movement of the sliding mechanism.

Thus there exists an opportunity and need for an improved system and method for an electrical power track and slidable accessories.

SUMMARY OF THE INVENTION

The present invention generally provides a system and a method for new and innovative techniques for an electrical power track assembly and a slidably mounted accessories power connection assembly.

According to the present invention, a system for vehicle interior electrical power distribution is provided. The system comprises an electrical power track assembly having at least one electrical power strip and at least one electrical ground strip, and an electrical connector assembly slidable in the track assembly. The electrical connector assembly has a first set of electrical contacts and a second set of electrical contacts. The first set of electrical contacts are configured to maintain electrical connection with respective ones of the at least one electrical power strip and the at least one electrical ground strip during sliding such that the slidable connector assembly provides electrical power to respective ones of the second set of electrical contacts, and the second set of electrical contacts are configured to electrically couple to and provide electrical power to at least one removable electrical accessory that is installed to the slidable connector assembly.

Also according to the present invention, a method for providing electrical power distribution to the interior of a vehicle is provided. The method comprises mounting an electrical power distribution track assembly that has at least one electrical power strip and at least one electrical ground strip to an interior panel of the vehicle, and installing an electrical connector assembly slidable in the track assembly. The electrical connector assembly has a first set of electrical contacts and a second set of electrical contacts. The first set of electrical contacts are configured to maintain electrical connection with respective ones of the at least one electrical power strip and the at least one electrical ground strip during sliding such that the slidable connector assembly provides electrical power to respective ones of the second set of electrical contacts, and the second set of electrical contacts are configured to electrically couple to and provide electrical power to at least one removable electrical accessory that is installed to the slidable connector assembly.

Yet further, according to the present invention, an electrical power distribution system is provided. The system comprises a power distribution track assembly mounted to a trim panel that is interior to a vehicle, and an electrical connector assembly. The track assembly has at least one electrical power strip and at least one electrical ground strip. The electrical connector assembly is slidable in the track assembly via a slot in the trim panel, and has a first set of electrical contacts and a second set of electrical contacts. The first set of electrical contacts are configured to maintain electrical connection with respective ones of the at least one electrical power strip and the at least one electrical ground strip during sliding such that the slidable connector assembly provides electrical power to respective ones of the second set of electrical contacts, and the second set of electrical contacts are configured to electrically couple to and provide electrical power to at least one removable electrical accessory that is installed to a bezel section of the slidable connector assembly.

The above features, and other features and advantages of the present invention are readily apparent from the following detailed descriptions thereof when taken in connection with the accompanying drawings.

DETAILED DESCRIPTION OF THE PREFERRED EMBODIMENT(S)

With reference to the Figures, the preferred embodiments of the present invention will now be described in detail. Generally, the present invention provides an improved system and method for new and innovative techniques for an electrical power track and slidable accessories. The present invention may be advantageously implemented in connection with the rear cargo area of vehicles, particularly, but not exclusively large vehicles such as sport utility vehicles, cross-over vehicles, vans, minivans, busses, etc. with a cargo area (generally in the center or rear area of the vehicles) having a length generally greater than a meter.

In one example, the present invention generally implements an electrical power strip (e.g., a power track assembly) having a slidable power bezel assembly (i.e., docking station, carrier, glider, pod, electrical connector holder, electrical connector housing, etc.). The power track assembly may be installed to an interior side trim panel. The power docking station is generally mounted in a slotted channel in the interior side trim panel, and is slid to a desired location along the power track by a user. Electrical contacts in the power pod may provide power from the track power strips to the inside of the pod.

A variety of electrical accessories (e.g., rechargeable flashlight, extra interior lights, battery charger/recharger, conventional round plug 12 volt outlets, specialty or custom outlets, multiple connector ("Y" or "W") outlets, and the like) may be plugged in the connector housing and electrical power is generally provided thereby. The electrical power carrier may be slid (i.e., vertically, laterally or longitudinally moved) to a desired location on the power track before or after the accessory is plugged into the carrier.

The power bezel assembly generally has a spring loaded door (i.e., lid, top, hatch, cover, etc.) which may limit inadvertent access to (or contact with) the electrical contacts inside the contact housing. The access door may be oriented on top, bottom, front side or back side of power bezel assembly.

Figure 1A:
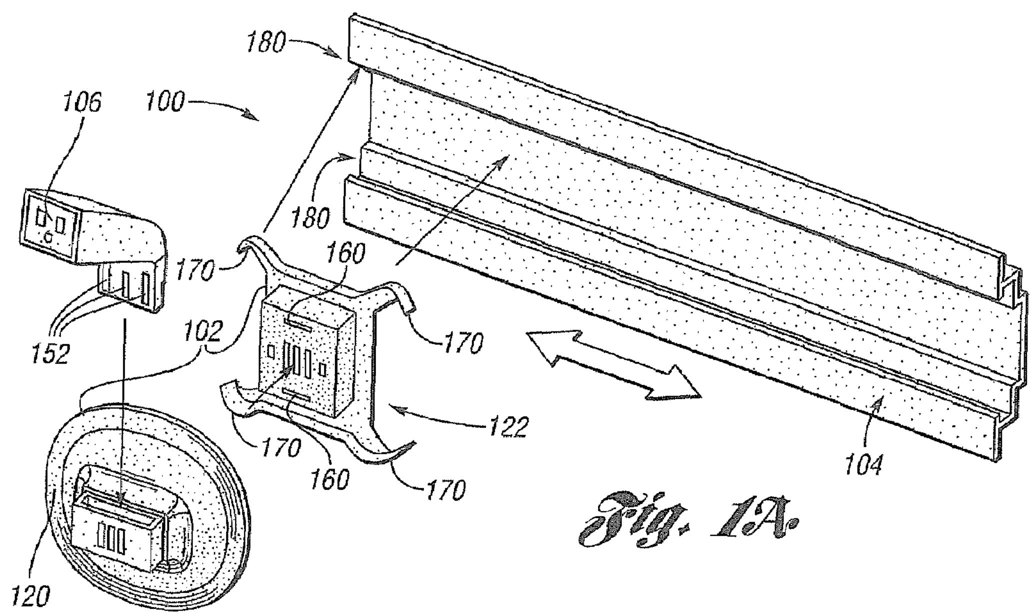
FIGS. 1A-B is an exploded perspective diagram of a power distribution system of the present invention.
Figure 1B:
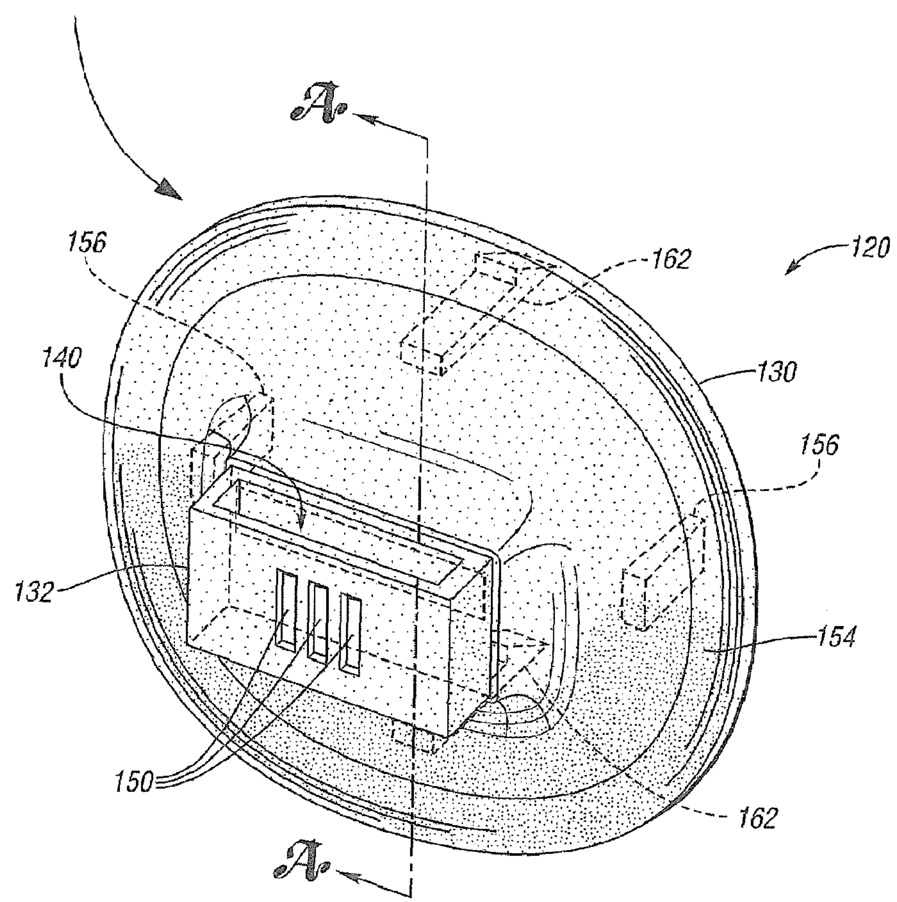

Referring to FIGS. 1A-B, a diagram illustrating one example of an electrical power distribution system 100 of the present invention is shown. The system 100 generally comprises a slidable connector assembly 102 and a power track assembly 104. At least one dockable electrical accessory 106 is generally configured to removably mount to (e.g., install in or on, attach to, connect to, hook up to, plug into, etc.) the connector assembly 102.

The assembly 102 is generally mechanically and electrically coupled to (e.g., mounted in, attached on, etc.) the electrical power distribution track 104. The assembly 102 generally provides electrical power to the at least one removable accessory 106 that is docked to the connector housing 102. The electrical accessory 106 generally is implemented as at least one of many different power accessory modules that provide a variety of uses (e.g., rechargeable flashlight, extra interior lights, power accessory outlet plug, battery charger/recharger, and the like). In one example, the electrical power distribution system 100 may be advantageously implemented in connection with the cargo area of a vehicle. However, the system 100 may be implemented in any appropriate environment to meet the design criteria of a particular application.

The slidable connector assembly 102 may be implemented as a power bezel assembly, docking station, carrier, glider, pod, electrical connector holder, electrical connector housing, and the like. The assembly 102 generally comprises a bezel section (i.e., portion, part, component, etc.) 120 and a track guide section 122. The sections 120 and 122 are generally mechanically and electrically coupled together to form the assembly 102.

The bezel section 120 generally comprises a bezeled carrier (e.g., facing piece, user section, etc.) 130 having a pocket (i.e., compartment, holder, cavity, etc.) 132 formed on the side of the carrier 130 that is opposite the side that is coupled to the track guide 122. The electrical accessory 106 generally has a extension (e.g., leg, protrusion, member, etc.) that plugs into the pocket 132.

A door (i.e., lid, top, hatch, cover, panel, etc.) 140 generally covers (i.e., limits inadvertent access to) the hole in the cavity 132 into which the extension of the accessory 106 is inserted. The door 140 may be spring loaded to a closed position when an accessory 106 is not mounted to the housing 102. The door 140 is generally displaced when the accessory 106 is mounted in the cavity 132 on the housing 102.

The compartment 132 generally includes a plurality of electrical contacts 150 therewithin that generally provide electrical power and electrical ground connections (i.e., paths, circuits, etc.) between matching respective electrical contacts 152 on the extension of the accessory 106 when the accessory 106 is installed in the housing 102.

Figures 2, 3:
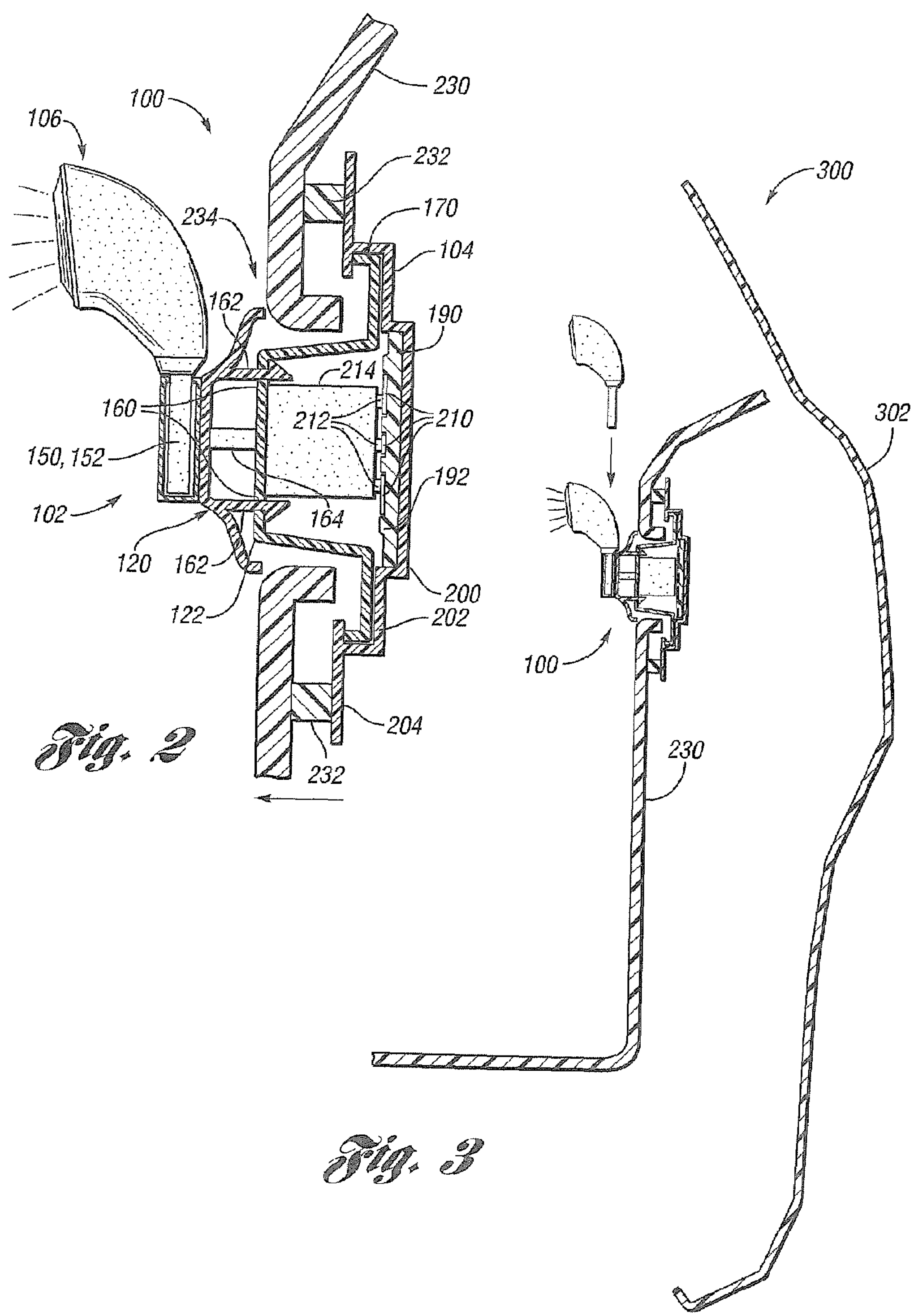
FIG. 2 is a cross-sectional view of the power distribution system of FIG. 1.
FIG. 3 is a cross-sectional view of the power distribution system of FIG. 1 in one example environment.

Referring to FIG. 2, a cross-sectional view of the power distribution system 100 taken at the line A-A of FIG. 1 is shown in connection with a mounting. In one example, the dockable bezel 120 may be mechanically coupled (e.g., snapped) to respective mating slots 160 in the track guide 122 via pronged extensions 162. In another example (not shown), the facing piece 120 may be mechanically coupled to the track guide 122 via heat staked extensions. In yet another example (not shown), the facing piece 120 may be mechanically coupled to the track guide 122 via adhered extensions. However, the facing piece 120 may be mechanically coupled to the track guide 122 via any appropriate coupling apparatus, device or system to meet the design criteria of a particular application.

Contact strips 164 generally provide an electrical path (i.e., a power circuit interconnection) from the contacts 150 in the cavity 132 to the track guide 122.

Referring back to the FIGS. 1A-B as well as FIG. 2, the compartment 132 may be enclosed within a pocket region 154 of the bezel assembly 130. Standoffs 156 may provide structural support to the pocket region 154 and may mechanically couple the pocket region 154 to the facing piece 132.

The guide 122 may be substantially rectangular or square and have a "hat shaped" profile having a crown region where the slots 160 are located and a brim region with legs 170 at each of the corners of the rectangular or square. The legs 170 may have a curved surface that is substantially perpendicular to the brim region. The power track assembly 104 may have notches 180 that are generally sized to receive the curved sections of the legs 170 when the carrier 102 is assembled to the power track 104.

The four corners of the track guide 122 each have one of the curved flange ends 170, and the curved flange ends 170 generally mimic rollers such that the track guide 122 generally slides along the track 104 when urged by a user. However, the curved flange ends 170 generally provide sufficient tension such that resistance to movement of the connector carrier 102 is provided, and the bezel assembly 102 generally remains as positioned by the user during normal operation.

Referring once again to FIG. 2, the power track assembly 104 generally comprises a mounting strip 190 and a power circuit carrier 192. The mounting strip 190 and the power circuit carrier 192 are generally assembled to perform as a single unit. In one example, the power circuit carrier 192 may be formed integrally with the mounting strip 190.

The mounting strip 190 generally comprises a back portion 200, a first step portion 202, and a second step portion 204 that are interconnected to form a multi-brimmed, hat-shaped cross-section where the back portion 200 is at the crown of the hat-shape and the step portions 202 and 204 are the multiple brims. The brim sections 202 and 204 are generally successively wider and successively more towards the inside. The mounting strip 190 is generally produced (i.e., manufactured, formed, etc.) as a plastic extrusion. However, the mounting strip 190 may be produced from any appropriate material using any appropriate process (e.g., casting, injection molding, stamping, folding, etc.) to meet the design criteria of a particular application.

The power circuit carrier 192 may be fastened (i.e., attached, fixed, etc.) to the side of the inside side of the back portion 200 in a recess formed between the back portion 200 and the first step portion 202. The power circuit carrier 192 generally includes a plurality of electrical power and ground strips 210. The electrical power and ground strips 210 are generally fastened to the inside side of the power circuit carrier 192 such that electrical contact and power is provided to respective electrical contacts (e.g., slide fingers, buttons, etc.) 212 which are mounted to a contact block 214 and in electrical communication with the respective contact strips 164 on the electrical power housing assembly 102.

In one example, the electrical power and ground strips 210, the respective electrical contacts 212, and the contact block 214 may be implemented as described in U.S. patent application Ser. No. 10/710,897 filed on Aug. 11, 2004 (Lear Disclosure No. 04966), which is incorporated by reference in its entirety. However, the electrical power and ground strips 210, the respective electrical contacts 212, and the contact block 214 may be implemented as any appropriate apparatuses to meet the design criteria of a particular application.

The track guide 122 generally slides in a "C" or "U" shaped recess formed between the brim 202 and the brim 204. The recess between the brim 202 and the brim 204 is generally sized such that the curved portions of the legs 170 fit snugly therewithin to provide smooth and stable sliding of the carrier 102 by a user.

The power track 104 is generally fastened to a vehicle interior trim panel 230 at the second step portion 204 via a plurality of fastening studs (e.g., stakes, stand-offs, projections, etc.) 232. The fastening of the power track 104 to the trim panel 230 may be implemented using screws, adhesive, heat staking, etc. as is appropriate for the design criteria of the particular application. The trim panel 230 is generally a cargo area interior trim panel (described, in one example, in connection with FIG. 3). The trim panel 230 generally includes a slot 234 where the assembly 102 extends from the track 104 and slides on the track 104. However, the system 100 may be implemented in connection with any appropriate environment to meet the design criteria of a particular application.

In one example assembly process (i.e., operation, procedure, etc.) for the system 100, the assembly 104 is installed on the trim panel 230, the track guide 122 is installed on the power track 104, and the bezel section 120 is mounted through the slot 234 to the track guide 122 to form the connector pod 102. The accessory 106 is generally plugged into the cavity 132 in the connector pod 102 via the access panel 140. However, as is appreciated by one of ordinary skill in the art, other assembly processes or orders may be implemented to meet the design criteria of a particular application.

Electrical power and ground may be externally provided to the respective power strips 210, through the respective contacts 212, through the respective power strips 164, and to the accessory 106 via the respective contact pairs 150 and 152.

Referring to FIG. 3, a diagram of a cross-sectional view of the system 100 in connection with a vehicle 300 is shown. The trim panel 230 is generally mounted interior of a vehicle body 302. The system 100 is generally installed to the interior trim panel 230 as described above in connection with FIG. 2.

As is readily apparent from the foregoing description, then, the present invention generally provides an improved method and an improved system for new and innovative techniques for an electrical power track and slidable accessories. The present invention generally overcomes or reduces the negative effects of the deficiencies of conventional approaches.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for vehicle interior electrical power distribution, the system comprising:

an electrical power track assembly having at least one electrical power strip and at least one electrical ground strip; and an electrical connector assembly slidable in the track assembly and having a first set of electrical contacts and a second set of electrical contacts, wherein the first set of electrical contacts are configured to maintain electrical connection with respective ones of the at least one electrical power strip and the at least one electrical ground strip during sliding such that the slidable connector assembly provides electrical power to respective ones of the second set of electrical contacts, and the second set of electrical contacts are configured to electrically couple to and provide electrical power to at least one removable electrical accessory when the at least one removable electrical accessory is mechanically attached to the electrical connector assembly.

2. The system of claim 1 wherein the at least one removable electrical accessory is at least one of a rechargeable flashlight, extra interior lights, a power accessory outlet plug, and a battery charger/recharger.

3. The system of claim 1 wherein the electrical connector assembly further comprises a housing having a cavity therein, and the second set of electrical contacts are within the cavity.

4. The system of claim 3 wherein the at least one removable electrical accessory is installed to the electrical connector assembly in the cavity, and the cavity has a spring loaded door that is displaced when the at least one removable electrical accessory is installed.

5. The system of claim 1 wherein the electrical connector assembly comprises a substantially square or rectangular shaped member that includes a curved leg at each corner, and the curved legs mimic rollers that slide within the track assembly.

6. The system of claim 5 wherein the track assembly comprises a multi-brimmed hat shaped section, and the at least one electrical power strip and at least one electrical ground strip are fastened to the crown portion of the hat shaped section such that respective ones of the first set of electrical contacts are provided electrical power and ground.

7. The system of claim 6 wherein the multi-brimmed hat shaped section comprises two brims, and the curved legs slide in a "C" or "U" shaped region formed between the two brims.

8. A method for providing electrical power distribution to the interior of a vehicle, the method comprising:

mounting an electrical power distribution track assembly having at least one electrical power strip and at least one electrical ground strip to an interior panel of the vehicle; and installing an electrical connector assembly slidable in the track assembly, the assembly having a first set of electrical contacts and a second set of electrical contacts, wherein the first set of electrical contacts are configured to maintain electrical connection with respective ones of the at least one electrical power strip and the at least one electrical ground strip during sliding such that the slidable connector assembly provides electrical power to respective ones of the second set of electrical contacts, and the second set of electrical contacts are configured to electrically couple to and provide electrical power to at least one removable electrical accessory when the at least one removable electrical accessory is mechanically attached to the electrical connector assembly.

9. The method of claim 8 wherein the at least one removable electrical accessory is at least one of a rechargeable flashlight, extra interior lights, a power accessory outlet plug, and a battery charger/recharger.

10. The method of claim 8 wherein the electrical connector assembly further comprises a housing having a cavity therein, and the second set of electrical contacts are within the cavity.

11. The method of claim 10 wherein the at least one removable electrical accessory is installed to the electrical connector assembly in the cavity, and the cavity has a spring loaded door that is displaced when the at least one removable electrical accessory is installed.

12. The method of claim 8 wherein the electrical connector assembly comprises a substantially square or rectangular shaped member that includes a curved leg at each corner, and the curved legs mimic rollers that slide within the track assembly.

13. The method of claim 12 wherein the track assembly comprises a multi-brimmed hat shaped section, and the at least one electrical power strip and at least one electrical ground strip are fastened to the crown portion of the hat shaped section such that respective ones of the first set of electrical contacts are provided electrical power and ground.

14. The method of claim 13 wherein the multi-brimmed hat shaped section comprises two brims, and the curved legs slide in a “C” or “U” shaped region formed between the two brims.

15. An electrical power distribution system, the system comprising:

a power distribution track assembly mounted to a trim panel that is interior to a vehicle, the track assembly having at least one electrical power strip and at least one electrical ground strip; and an electrical connector assembly slidable in the track assembly via a slot in the trim panel, and having a first set of electrical contacts and a second set of electrical contacts, wherein the first set of electrical contacts are configured to maintain electrical connection with respective ones of the at least one electrical power strip and the at least one electrical ground strip during sliding such that the slidable connector assembly provides electrical power to respective ones of the second set of electrical contacts, and the second set of electrical contacts are configured to electrically couple to and provide electrical power to at least one removable electrical accessory when the at least one removable electrical accessory is mechanically attached to a bezel section of the electrical connector assembly.

16. The system of claim 15 wherein the bezel section of the electrical connector assembly further comprises a housing having a cavity therein, the second set of electrical contacts are within the cavity, and the at least one removable electrical accessory is installed to the electrical connector assembly in the cavity, and the cavity has a spring loaded door that is displaced when the at least one removable electrical accessory is installed.

17. The system of claim 15 wherein the at least one removable electrical accessory is at least one of a rechargeable flashlight, extra interior lights, a power accessory outlet plug, and a battery charger/recharger.

18. The system of claim 15 wherein the electrical connector assembly comprises a substantially square or rectangular shaped member that includes a curved leg at each corner, and the curved legs mimic rollers that slide within the track assembly.

19. The system of claim 18 wherein the track assembly comprises a multi-brimmed hat shaped section, and the at least one electrical power strip and at least one electrical ground strip are fastened to the crown portion of the hat shaped section such that respective ones of the first set of electrical contacts are provided electrical power and ground.

20. The system of claim 19 wherein the multi-brimmed hat shaped section comprises two brims, and the curved legs slide in a “C” or “U” shaped region formed between the two brims.

* * * * *